United States Patent
Yang et al.

(10) Patent No.: US 9,655,136 B2
(45) Date of Patent: May 16, 2017

(54) METHOD AND APPARATUS FOR REVERSE DIRECTION PROTOCOL TRANSMISSION IN WIRELESS LOCAL AREA NETWORK

(71) Applicant: Huawei Technologies Co., Ltd., Shenzhen, Guangdong (CN)

(72) Inventors: Lvxi Yang, Shenzhen (CN); Hao Li, Shenzhen (CN); Chunguo Li, Shenzhen (CN); Tianyu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 14/095,006

(22) Filed: Dec. 3, 2013

(65) Prior Publication Data

US 2014/0086227 A1 Mar. 27, 2014

Related U.S. Application Data

(63) Continuation of application No. PCT/CN2012/072999, filed on Mar. 26, 2012.

(30) Foreign Application Priority Data

Jun. 25, 2011 (CN) .......................... 2011 1 0173864
Sep. 7, 2011 (CN) .......................... 2011 1 0264197

(51) Int. Cl.
*H04W 4/00* (2009.01)
*H04W 72/12* (2009.01)
*H04W 84/12* (2009.01)

(52) U.S. Cl.
CPC ... *H04W 72/1263* (2013.01); *H04W 72/1268* (2013.01); *H04W 84/12* (2013.01)

(58) Field of Classification Search
CPC .............................................. H04W 72/1263
(Continued)

(56) References Cited

U.S. PATENT DOCUMENTS

2006/0109814 A1 5/2006 Kuzminskiy et al.
2006/0227733 A1 10/2006 Frederiks et al.
(Continued)

FOREIGN PATENT DOCUMENTS

CN 1898918 A 1/2007
CN 101366241 A 2/2009
(Continued)

OTHER PUBLICATIONS

Allan Zhu, et al., "TXOP Sharing for DL MU-MIMO Support", IEEE 802.11-10/1123R0, Sep. 2010, 16 pages.
(Continued)

*Primary Examiner* — Ricky Ngo
*Assistant Examiner* — Wei-Po Kao

(57) ABSTRACT

Embodiments of the present invention relate to communication technologies, in particular, to a method and an apparatus for protocol transmission in a wireless local area network. A method for transmitting multi-user data in a reverse direction protocol according to an embodiment of the present invention includes: within a transmission opportunity (TXOP) of a first station, if the TXOP is not over after the first station finishes sending data to an access point (AP), obtaining, by the AP, the TXOP, where the obtaining, by the AP, the TXOP is implemented through granting a remaining part of the TXOP to the access point AP by the first station as a reverse direction protocol initiator; and within the TXOP, sending, by the AP, second data to at least two stations, where the at least two stations include the first station.

6 Claims, 2 Drawing Sheets

(58) Field of Classification Search
USPC .................................................. 370/310–350
See application file for complete search history.

(56) References Cited

U.S. PATENT DOCUMENTS

| | | | |
|---|---|---|---|
| 2007/0010971 A1 | 1/2007 | Nikolova et al. | |
| 2007/0058605 A1* | 3/2007 | Meylan et al. | 370/346 |
| 2007/0171858 A1 | 7/2007 | Grandhi et al. | |
| 2007/0248117 A1* | 10/2007 | Zuniga et al. | 370/468 |
| 2008/0095091 A1 | 4/2008 | Surineni et al. | |
| 2009/0252110 A1 | 10/2009 | Sridhara et al. | |
| 2009/0252143 A1 | 10/2009 | Sridhara et al. | |
| 2010/0040033 A1* | 2/2010 | Xhafa et al. | 370/338 |
| 2010/0061342 A1 | 3/2010 | Frederiks et al. | |
| 2011/0116487 A1 | 5/2011 | Grandhi | |
| 2011/0194644 A1 | 8/2011 | Liu et al. | |
| 2011/0249605 A1* | 10/2011 | Kwon | H04W 52/0229 370/311 |
| 2012/0099530 A1 | 4/2012 | Morioka et al. | |

FOREIGN PATENT DOCUMENTS

| | | |
|---|---|---|
| CN | 101433022 A | 5/2009 |
| CN | 102007723 A | 4/2011 |
| KR | 10-2008-0069510 | 7/2008 |
| KR | 10-2009-0008360 | 1/2009 |
| RU | 2407187 C2 | 12/2010 |
| RU | 2413370 C2 | 2/2011 |
| RU | 2421924 C2 | 6/2011 |
| WO | WO 2007/127311 A2 | 11/2007 |
| WO | WO 2010/128608 A1 | 11/2010 |

OTHER PUBLICATIONS

"Part 11: Wireless LAN Medium Access Control (MAC) and Physical Layer (PHY) Specifications, Amendment 5: Enhancements for Higher Throughput", IEEE Std 802.11n, Sep. 11, 2009, 536 pages.

"Part 11: Wireless LAN Medium Access Control (MAC) and Physical Layer (PHY) Specifications, Amendment 5: Enhancements for Very High Throughput for Operation in Bands below 6 GHz", IEEE P802.11ac./D1.4, Nov. 2011, 347 pages.

* cited by examiner

METHOD AND APPARATUS FOR REVERSE DIRECTION PROTOCOL TRANSMISSION IN WIRELESS LOCAL AREA NETWORK

CROSS-REFERENCE TO RELATED APPLICATIONS

This application is a continuation of International Application No. PCT/CN2012/072999, filed on Mar. 26, 2012, which claims priority to Chinese Patent Application No. 201110173864.X, filed on Jun. 25, 2011 and Chinese Patent Application No. 201110264197.6, filed on Sep. 7, 2011, all of which are hereby incorporated by reference in their entireties.

TECHNICAL FIELD

Embodiments of the present invention relate to communication technologies, and in particular, to a method and an apparatus for protocol transmission in a wireless local area network.

BACKGROUND

At present, a transmission opportunity (TXOP, transmission opportunity) mechanism is supported in a wireless local area network, where when obtaining a transmission opportunity, a station (STA, station) may reserve a period of time during which one or multiple data frames may be transmitted continuously. The station obtaining the transmission opportunity is called a transmission opportunity holder (TXOP holder). A NAV (network allocation vector, network allocation vector) is set at a station of a receiver of data sent by a non-transmission opportunity holder, so as to ensure that the non-transmission opportunity holder does not contend within a time range reserved by the transmission opportunity holder.

However, in a specific application, a problem of asymmetrical uplink and downlink data traffic usually occurs in the wireless local area network, that is, data traffic in one link direction is far heavier than that in the other link direction. In order to solve the problem, a reverse direction protocol (reverse direction protocol, RD) mechanism is supported in a current standard, which refers to that: When a station (assumed to be STA-a) obtains, by contending, a transmission opportunity (TXOP) of a certain time length, if there is remaining time after the station finishes sending data to another station (assumed to be STA-b), it may grant a right to use a channel to STA-b; and STA-b sends data to STA-a by using the remaining TXOP time, and returns the transmission opportunity to STA-a after finishing the sending. STA-a is called a reverse direction protocol RD initiator, while STA-b is called a reverse direction protocol RD responder.

With the development of technologies, a multi-user transmission (for example: Multi-Users Multi-input and Multi-output, MU-MIMO) technology is introduced, that is, a station simultaneously sends data to two or more than two stations in a same frequency band. In the MU-MIMO technology, orthogonality of channels between users is mainly utilized, channel utilization is improved, and system throughput is increased. However, a current reverse direction protocol mechanism cannot transmit MU-MIMO data. Therefore, a capability of an access point AP for sending the MU-MIMO data is limited, the channel utilization is reduced, which is bad for improving the system throughput.

SUMMARY

Embodiments of the present invention provide a method for transmitting multi-user data in a reverse direction protocol, which can further improve channel utilization when a case of asymmetrical uplink and downlink data traffic exists in a network.

A method for transmitting multi-user data in a reverse direction protocol according to an embodiment of the present invention includes:

within a transmission opportunity TXOP of a first station, if the TXOP is not over after the first station finishes sending data to an access point AP, obtaining, by the AP, the TXOP, where the obtaining, by the AP, the TXOP is implemented through granting a remaining part of the TXOP to the access point AP by the first station as a reverse direction protocol initiator; and within the TXOP, sending, by the AP, second data to at least two stations, where the at least two stations include the first station.

Further, an embodiment of the present invention provides an access point, including:

a TXOP obtaining unit, configured to: within a transmission opportunity TXOP of a first station, if the TXOP is not over after the first station finishes sending data to an access point AP, obtain the TXOP, where the obtaining, by the AP, the TXOP is implemented through granting a remaining part of the TXOP to the access point AP by the first station as a reverse direction protocol initiator; and a sending unit, configured to send second data to at least two stations within the TXOP, where the at least two stations include the first station.

In the embodiments of the present invention, the TXOP of the STA is transferred to the AP through the reverse direction protocol within uplink TXOP time, so that data may be sent to multiple stations by using a multi-user transmission capability of the AP, thereby improving channel utilization, enhancing flexibility of the reverse direction protocol, providing a new method for solving a contradiction of asymmetrical uplink and downlink traffic, and further improving overall system throughput.

DETAILED DESCRIPTION

In a wireless local area network, each access point AP or station STA contends for a channel; and an AP or an STA obtaining a channel by contending is a TXOP holder, while that not obtaining a channel by contending is a non-TXOP holder. In the embodiments of the present invention, a reverse direction protocol at the MAC layer of the wireless local area network is combined with MU-MIMO to improve channel utilization.

In a specific application, the embodiments of the present invention may be implemented by either an AP or an STA in the wireless local area network. In an embodiment of the present invention, a first station STA (STA1) obtains a transmission opportunity (TXOP). Within this TXOP, the STA, after the STA finishes sending data to an AP, the STA1 is used as a reverse direction protocol initiator to grant the TXOP to the access point AP.

Figure 1:
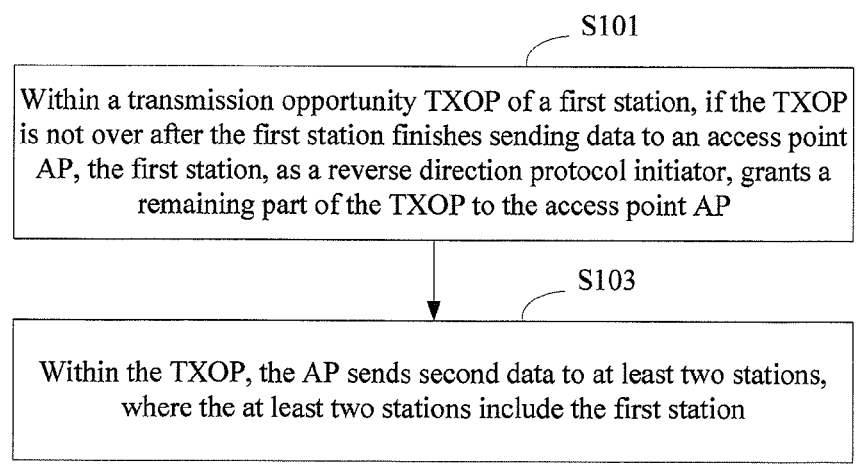
FIG. 1 is a flowchart of a method for transmitting multi-user data in a reverse direction protocol according to an embodiment of the present invention.

FIG. 1 is a flowchart of a method according to an embodiment of the present invention. A method for transmitting multi-user (for example: MU-MIMO) data in a reverse direction protocol includes:

S101: Within a transmission opportunity TXOP of a first station, if the TXOP is not over after the first station finishes sending data to an access point AP, the first station, as a reverse direction protocol initiator, grants a remaining part of the TXOP to the access point AP.

In this step, first data may be regarded as all data that needs to be sent to the AP by the first station within the TXOP. When the first station finishes sending the data, if the TXOP is not over, the TXOP is transferred to the AP. When finishing the transmission, the first station STA1 sets an RDG/More PPDU bit to 1 in a last frame to indicate that a remaining TXOP is granted to a transmission object.

S103: Within the TXOP, the AP sends second data to at least two stations, where the at least two stations include the first station.

When the AP selects a group of multiple users to send the second data, the user group needs to include the first station. When a user group multiplexing technology is applied in the selected user group, the first station needs to be included in a multiplexing mode of the selected user group. In an application, in this step, the AP sends data to multiple users after obtaining the TXOP.

Further, after receiving the multi-user data, a target station of the AP sends, to the AP, acknowledgement information about receiving the data; the access point receives acknowledgement information after the first station receives the second data; and the target station may not send the acknowledgement information provided that the AP ensures success of sending the data.

In the embodiment of the present invention, the TXOP of the STA is transferred to the AP through the reverse direction protocol within uplink TXOP time, so that data may be sent to multiple stations by using a multi-user transmission capability of the AP, thereby improving channel utilization, enhancing flexibility of the reverse direction protocol, providing a new method for solving a contradiction of asymmetrical uplink and downlink traffic, and further improving overall system throughput.

Figure 2:
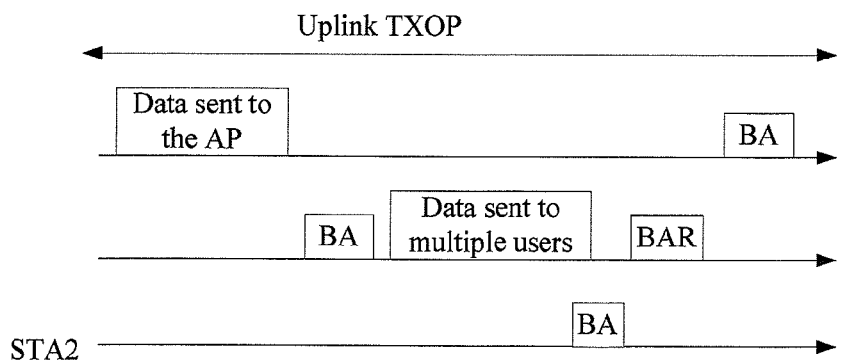
FIG. 2 is a schematic diagram of sending timeslots for transmitting multi-user data in a reverse direction protocol according to an embodiment of the present invention.

Further, with reference to FIG. 2, which is a schematic diagram of sending timeslots, another embodiment of the present invention is described.

A first station STA1 of a user obtains a TXOP, and sends data to an AP. After all data that needs to be sent to the AP by the first station STA1 is completely sent, and after the first station STA1 grants a channel to the AP, the TXOP is transferred to the AP.

After the first station STA1 of the user grants the channel (transmission opportunity) to the AP, the AP may simultaneously send data to multiple users (for example, STA1 and STA2) by using a right to use the channel. Here, the data sent by the AP needs to include data sent to the first station STA1. That is, the AP, as a reverse direction protocol responder, needs to send data to a protocol initiator.

Further, after the AP finishes sending the multi-user data, if an entire TXOP is not over, the AP needs to return the right to use the channel to the first station (STA1), a reverse direction protocol initiator. A manner for returning the right to use the channel is to finally send a block acknowledgement request (BAR) signal to the STA1; a reverse direction grant/more physical layer protocol data unit (RDG/More PPDU) bit in a block acknowledgement request is set to 0, indicating that no more data needs to be sent; after receiving the block acknowledgement request signal, the STA1 responds to the acknowledgement signal and takes back the right to use the channel. In a more preferred implementation manner, before the AP returns a right to use the TXOP, the AP needs to confirm that all target STAs, except the STA1, have sent an acknowledgement frame such as an ACK or a block acknowledgement BA frame to the AP.

Further, in the foregoing embodiment, a remaining part of the TXOP may be returned to the first station STA1, so that the TXOP is fully utilized, thereby further improving channel utilization and increasing system throughput.

In addition, an embodiment of the present invention further provides an apparatus for implementing the foregoing method. In a specific application, the device may be an AP or an STA in a wireless local area network. Generally, the AP in the wireless local area network is regarded as a special STA. In the embodiment, the AP is capable of implementing and completing all processes and steps of the foregoing method. The AP has physical or logical modules for completing all the foregoing functions and processes.

Figure 3:
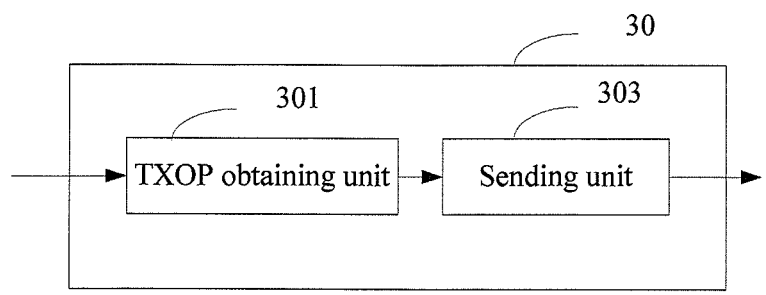
FIG. 3 is a schematic structural diagram of a wireless communication device according to an embodiment of the present invention.

FIG. 3 is a schematic structural diagram of a wireless communication device according to an embodiment of the present invention. An access point 30 includes:

a TXOP obtaining unit 301, configured to: within a transmission opportunity TXOP of a first station, if the TXOP is not over after the first station finishes sending data to the access point AP, obtain the TXOP, where the obtaining, by the AP, the TXOP is implemented through granting a remaining part of the TXOP to the access point AP by the first station as a reverse direction protocol initiator; and a sending unit 303, configured to send second data to at least two stations within the TXOP, where the at least two stations include the first station.

Further, if the TXOP is not over after the AP finishes sending the second data within the TXOP, the sending unit may further send a block acknowledgement request BAR to the first station, where the block acknowledgement request is used for returning the TXOP to the first station. One implementation manner may be that the block acknowledgement request includes a more physical layer data unit more PPDU bit that is set to 0. In this embodiment, the TXOP may be taken back not according to a condition of channel idle time PIFS.

In the embodiment of the present invention, the TXOP of the STA is transferred to the AP through a reverse direction protocol within uplink TXOP time, so that data may be sent to multiple stations by using a multi-user transmission capability of the AP, thereby improving channel utilization, enhancing flexibility of the reverse direction protocol, providing a new method for solving a contradiction of asymmetrical uplink and downlink traffic, and further improving overall system throughput.

Persons of ordinary skill in the art may understand that, all or part of steps of the foregoing method embodiments may be implemented by a program instructing relevant; the program may be stored in a computer readable storage medium, and when the program is executed, the steps of the foregoing method embodiments are executed; and the storage medium may be any medium capable of storing program codes, such as a ROM, a RAM, a magnetic disk, or an optical disk.

What is claimed is:

1. A method for transmitting multi-user data in a reverse direction grant protocol, the method comprising:
within a transmission opportunity (TXOP) of a first station, if the TXOP is not over after the first station finishes sending first data to an access point (AP), obtaining, by the AP, the TXOP, wherein obtaining, by the AP, the TXOP is implemented through granting a remaining part of the TXOP to the AP by the first station as a reverse direction initiator;
within the TXOP, sending, by the AP, second data to at least two stations simultaneously, wherein the at least two stations comprise the first station;
wherein the AP is a reverse direction responder;
if the TXOP is not over after the AP finishes sending the second data to the at least two stations, returning, by the AP, the TXOP to the first station; and
wherein after receiving all acknowledgement frames (ACKs) or block acknowledgement (BA) frames, wherein the all ACKs or the BA frames are sent by all stations which are of the at least two stations, except the first station, and need to send the ACKs or the BA frames to the AP, the AP returns the TXOP to the first station.

2. The method according to claim 1, further comprising:
if the TXOP is not over after the AP finishes sending the second data within the TXOP, sending, by the AP, a block acknowledgement request (BAR) to the first station, wherein the BAR is used by the AP for returning the TXOP to the first station.

3. The method according to claim 2, wherein the BAR comprises a reverse direction grant/more physical layer data unit (RDG/more PPDU) bit that is set to 0.

4. An access point, comprising:
a processor, configured to:
within a transmission opportunity (TXOP) of a first station, if the TXOP is not over after the first station finishes sending first data to the access point (AP), obtain the TXOP by granting a remaining part of the TXOP to the AP by the first station as a reverse direction initiator; and
a transmitter, configured to send second data to at least two stations simultaneously within the TXOP, wherein the at least two stations comprise the first station;
wherein the AP is a reverse direction responder;
the transmitter is further configured to:
if the TXOP is not over after the AP finishes sending the second data to the at least two stations, return the TXOP to the first station;
wherein after the processor receives all acknowledgement frames (ACKs) or block acknowledgement (BA) frames, wherein the all ACKs or the BA frames are sent by all stations which are of the at least two stations, except the first station, and need to send the ACKs or the BA frames to the AP, the transmitter returns the TXOP to the first station.

5. The access point according to claim 4, wherein the transmitter is further configured to:
if the TXOP is not over after the AP finishes sending the second data within the TXOP, send a block acknowledgement request (BAR) to the first station, wherein the BAR is used for returning the TXOP to the first station.

6. The access point according to claim 5, wherein the BAR sent by the transmitter comprises a reverse direction grant/more physical layer data unit (RDG/more PPDU) bit that is set to 0.

* * * * *